United States Patent Office 3,503,960
Patented Mar. 31, 1970

3,503,960
2 - CYANO - 3 - AMINO - 19 - NOR - PREGNA-1,3,5(10)-TRIENES AND A METHOD FOR THEIR PREPARATION
Pietro de Ruggieri, Carmelo Gandolfi, and Umberto Guzzi, Milan, Italy, assignors to Ormonoterapia Richter S.p.A., Milan, Italy, a corporation of Italy
No Drawing. Filed Aug. 22, 1966, Ser. No. 573,784
Claims priority, application Italy, Aug. 23, 1965, 18,857/65
Int. Cl. C07c 173/00, 169/26
U.S. Cl. 260—239.5
4 Claims

ABSTRACT OF THE DISCLOSURE

Compounds of the formula:

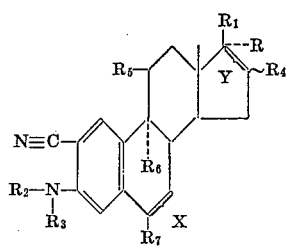

where:

R is hydrogen, hydroxy, 2'-tetrahydropyranyloxy or acyloxy;
$R_1$ is

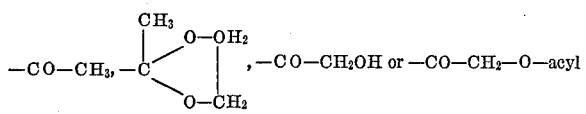

R and $R_1$ together may be 17,20:20,21-bismethylenedioxy;
$R_2$ is hydrogen, 2'-tetrahydropyranyl, lower alkyl, phenyl, benzyl, methoxycarbonyl or ethoxycarbonyl;
$R_3$ is hydrogen, lower alkyl or acyl;
$R_2$ and $R_3$ together may be

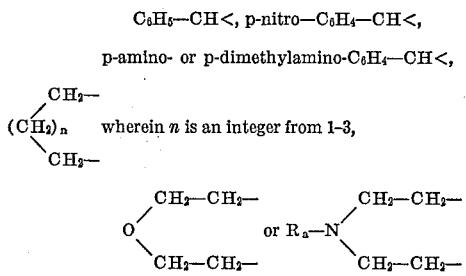

wherein $R_a$ is hydrogen or lower alkyl;
$R_4$ is hydrogen, chloro, bromo, iodo, hydroxy or methyl;
$R_5$ is hydrogen, ($\alpha$ or $\beta$) hydroxy or keto;
$R_6$ is hydrogen, chloro or fluoro;
$R_7$ is hydrogen, methyl, chloro or fluoro; and X and Y are a single or double bond.

These compounds have therapeutic activity as cortical, hypocholesterolemic and hypophysis-blocking drugs.

This invention relates to the compounds of following formula:

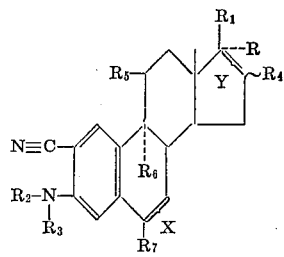

where the steroidal ring A is an aromatic ring and, being mesomeric, is indifferently 1,3,5(10)-triene and 2,4,10(1)-triene; wherein:

R is a member selected from the group consisting of hydrogen, hydroxy, 2'-tetrahydropyranyloxy

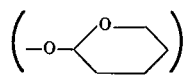

acyloxy whose acyl radical is derived from that of a saturated or unsaturated carboxylic acid having 2 to 10 carbon atoms;
$R_1$ is a member selected from the group consisting of:

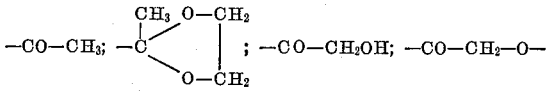

whose acyl radical is derived from a saturated or unsaturated carboxylic acid having 2 to 10 carbon atoms, and from phenylacetic, phenylpropionic, (cis and trans) cinnamic, phenylpropiolic, benzoic, salicyclic and p-amino-benzoic acids;
R and $R_1$ together are as follows:

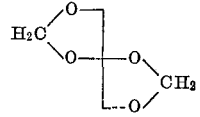

$R_2$ is a member selected from the group consisting of hydrogen, 2'-tetrahydropyranyl

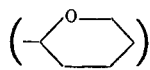

lower alkyl, phenyl, benzyl, methoxycarbonyl $(CH_3-O-CO-)$ and ethoxycarbonyl ($C_2H_5$—O—CO—);
$R_3$ is a member selected from the group consisting of hydrogen, lower alkyl, acyl with the acyl radical equal to that of a saturated or unsaturated aliphatic acid having 2 to 10 carbon atoms and of phenylacetic, phenylpropionic, (cis and trans) cinnamic, phenylpropiolic, benzoic, salicyclic, p-amino-benzoic acids;
$R_2$ and $R_3$ together are:

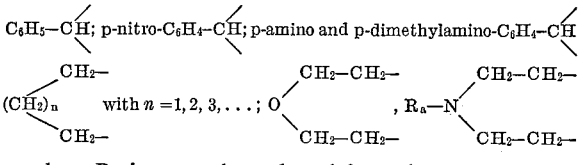

where $R_a$ is a member selected from the group consisting of hydrogen and lower alkyl;
$R_4$ is a member selected from the group consisting of hydrogen, chlorine, bromine, iodine, hydroxy, methyl (all these substituents can take the $\alpha$ and $\beta$ configuration);

$R_5$ is a member selected from the group consisting of hydrogen, ($\alpha$ and $\beta$) hydroxy, ketone;

$R_6$ is a member selected from the group consisting of hydrogen, chlorine, fluorine;

$R_7$ is a member selected from the group consisting of hydrogen, methyl, chlorine, fluorine (all these substitutents take the $\alpha$ and $\beta$ configuration);

X and Y are members selected from the group consisting of a single and a double bond.

These compounds which have a therapeutical activity, as cortical, hypocholesterolemic, hypophysis - blocking drugs, are synthesized by starting from the compounds of following formula:

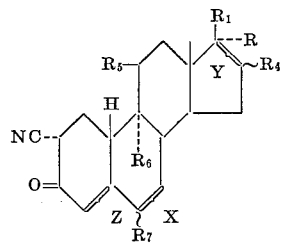

wherein:

R is a member selected from the group consisting of hydrogen, hydroxy, 2'-tetrahydropyranyloxy

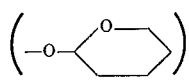

acyloxy whose acyl radical is derived from that of a saturated or unsaturated carboxylic acid having 2 to 10 carbon atoms;

$R_1$ is a member selected from the group consisting of:

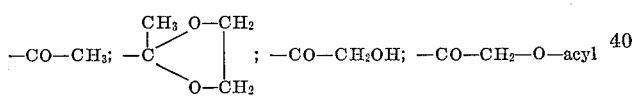

whose acyl radical is derived from a saturated or unsaturated carboxylic acid having 2 to 10 carbon atoms, and from phenylacetic, phenylpropionic (cis and trans) cinnamic, phenylpropiolic, benzoic, salicyclic and p-amino-benzoic acids;

R and $R_1$ together are as follows:

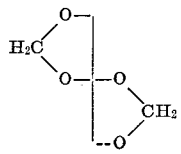

$R_4$ is a member selected from the group consisting of hydrogen, chlorine, bromine, iodine, hydroxy, methyl (all these substituents can take the $\alpha$ and $\beta$ configuration);

$R_5$ is a member selected from the group consisting of hydrogen, ($\alpha$ and $\beta$) hydroxy, ketone;

$R_6$ is a member selected from the group consisting of hydrogen, chlorine, fluorine;

$R_7$ is a member selected from the group consisting of hydrogen, methyl, chlorine, fluorine (all these substituents take the $\alpha$ and $\beta$ configuration);

X, Y and Z are members selected from the group consisting of a single and a double bond.

From these compounds, by reaction in solvents selected from the group consisting of toluene, benzene, iso-octane, with aromatic and aliphatic primary and secondary amines selected in the group consisting of n-propyl, n-butyl, sec-butyl, n-pentyl, n-hexyl-amine, diethylamine, butyl-ethyl-amine, aniline, benzylamine, and also with secondary amines selected in the group consisting of:

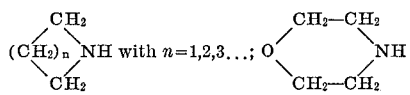

and of

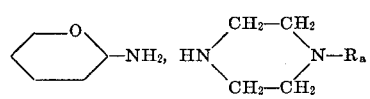

wherein $R_a$ is a member selected from the group consisting of hydrogen, lower alkyl, or, still from the same compounds by reaction with ammonium formate or with the formates of the above mentioned amines, in absolute ethanol, the compounds of following formula are obtained:

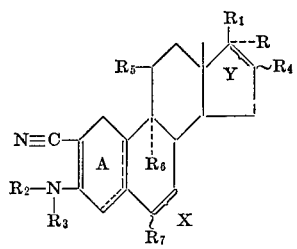

where:

R is a member selected from the group consisting of hydrogen, hydroxy, 2'-tetrahydropyranyloxy

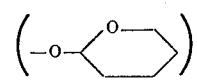

acyloxy whose acyl radical is derived from that of a saturated or unsaturated carboxylic acid having 2 to 10 carbon atoms;

$R_1$ is a member selected from the group consisting of:

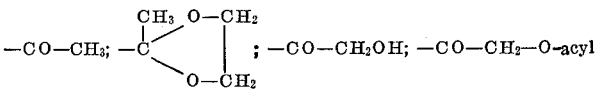

whose acyl radical is derived from a saturated or unsaturated carboxylic acid having 2 to 10 carbon atoms, and from phenyl acetic, phenylpropionic, (cis and trans) cinnamic, phenylpropiolic, benzoic, salicylic and p-amino-benzoic acids;

R and $R_1$ together is 17,20:20,21-bis-methylendioxy;

$R_2$ is a member selected from the group consisting of hydrogen, 2'-tetrahydropyranyl

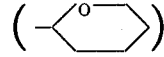

lower alkyl, phenyl, benzyl, methoxycarbonyl $(CH_3—O—CO—)$ and ethoxycarbonyl $(C_2H_5—O—CO—)$;

$R_3$ is a member selected from the group consisting of hydrogen, lower alkyl, acyl with the acyl radical equal to that of a saturated or unsaturated aliphatic acid having 2 to 10 carbon atoms and of phenylacetic, phenylpropionic, (cis and trans) cinnamic, phenylpropiolic, benzoic, salicylic, p-amino-benzoic acids;

$R_2$ and $R_3$ together are:

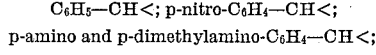

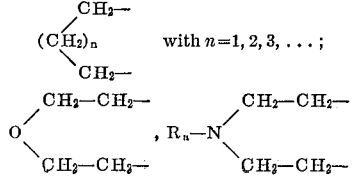

where $R_a$ is a member selected from the group consisting of hydrogen and lower alkyl;

$R_4$ is a member selected from the group consisting of hydrogen, chlorine, bromine, iodine, hydroxy, methyl (all these substituents can take the $\alpha$ and $\beta$ configuration);

$R_5$ is a member selected from the group consisting of hydrogen, ($\alpha$ and $\beta$) hydroxy, ketone;

$R_6$ is a member selected from the group consisting of hydrogen, chlorine, fluorine;

$R_7$ is a member selected from the group consisting of hydrogen, methyl, chlorine, fluorine (all these substituents take the $\alpha$ and $\beta$ configuration);

X and Y are members selected from the group consisting of a single and a double bond, and the dotted line binding the 4,5 and 10 carbon atoms of the ring A indicates that the obtained products are a mixture of the 4-5 and 5-(10)-ene isomers, which can be separated by both fractionated crystallization and chromatography into the two pure isomers indicated by the following formulas:

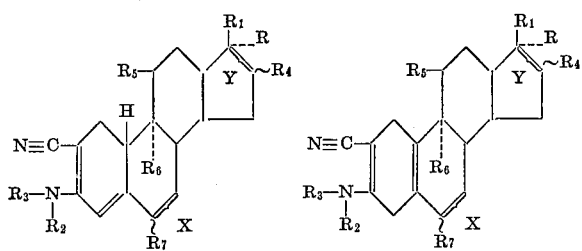

The mixture of the two isomers and the individual isomers are subsequently dehydrogenated and aromatized in the presence of hydrogen acceptors selected in both the group consisting of methyl and ethyl esters of unsaturated maleic, fumaric, (cis and trans) cinnamic acids and in the group consisting of ethylene compounds stilbene, styrene, and in the group consisting of the following quinones, 2,3-dichloro-5,6-dicyano-benzoquinone (DDQ) and tetrachlorobenzoquinone (chloranil) with or without the aid of hydrogen transfer agents selected in the group consisting of Pd/C and Pt/C, in solvents selected in the group consisting of benzene, dioxane, iso-octane, ethylene glycol, mineral oil.

The following examples serve to illustrate the invention and do not limit it in any way.

EXAMPLE 1

2-cyano-3-amino-19-nor-pregna-1,3,5(10)-triene-17α-ol-20-one-17-acetate 21 parts 2α - cyano - 19 - nor - pregna-4-en-17α-ol-3,20-dione-17-acetate in 1000 parts absolute ethanol is refluxed in a nitrogen current for 24 hours with 12 parts ammonium formate. The reaction mixture is concentrated under vacuum to dryness, the solids are suspended in water; the suspended product is filtered and washed to neutrality. It is crystallized from methanol to give 17 parts of a mixture consisting of 2-cyano-3-amino-19-nor-pregna-2,4-diene-17α-ol-20-one-17-acetate and 2-cyano-3-amino-19 - nor - pregna - 2,5(10) - diene - 17α - ol - 20 - one - 17-acetate, $\lambda_{max}$ 248, 261, 332 m$\mu$ ($\epsilon$=4,900, 4,500, 2,100).

11 parts of this mixture, dissolved in 200 parts dry dioxane are added with 15 parts diethylmaleate and refluxed under stirring for 20 hours with 10–12 parts 10% Pd/C. The catalyst is filtered off, the filtrate is evaporated to dryness. The product is crystallized from methanol to give 9.5 parts 2-cyano-3-amino-19-nor-pregna-1,3,5(10)-triene-17α-ol-20-one-17-acetate $\lambda_{max}$ 210, 246, 331.5 m$\mu$ ($\epsilon$=45,800, 9,450, 4,000).

EXAMPLE 2

2-cyano-3-amino-19-nor-pregna-1,3,5(10)-triene-17α-ol-20-one-17-acetate 2.5 parts of the mixture of 2-cyano-3-amino-19-nor-pregna-2,4-diene-17α-ol-20-one-17-acetate and of 2 - cyano-3-amino-19-nor-pregna - 2,5(10) - diene - 17α-ol-20-one-17-acetate are dissolved in 150 parts dioxane and added with 2 parts 2,3-dicyano-5,6-dichlorobenzoquinone dissolved in 70 parts dioxane. After 5 minutes standing at room temperature, the mixture is diluted with 1000 parts methylene chloride. Then it is filtered and percolated through a silica gel column (400 g.). 3000 parts methylene chloride-dioxane (95:5) are passed through, and from the evaporated eluates there is obtained 1.8 parts 2 - cyano-3-amino-19-nor-pregna-1,3,5(10)-triene-17α-ol-20-one-17-acetate.

EXAMPLE 3

2-cyano-3 N-acetylamino-19-nor-pregna-1,3,5(10)-triene-17α-ol-20-one-17-acetate 10 parts of the mixture of the 2-cyano-3-amino-19-nor-pregna-2,4- and 2,5(10)-diene-17α-ol-20-one-17-acetates of Example 1 are dissolved in 60 parts pyridine; to this solution, 2.4 parts acetyl chloride are added at 0° C. The mixture is kept 2 hours at 0° C., then overnight at room temperature. After dilution with water and extraction with methylene chloride, it is washed to neutrality with water, it is dehydrated and evaporated. There is obtained 10 parts 2 cyano-3 N-acetylamino-19-nor-pregna-2,4 - diene and 2,5(10) - diene-17α-ol-20-one-17-acetate. $\lambda_{max}$ 243, 306 m$\mu$ ($\epsilon$=7,500, 2,250).

Such a mixture is chromatographed through an alumina column and by eluting with methylene chloride there is obtained 5.5 parts pure 2-cyano-3-acetylamino-19-nor-pregna - 2,5(10) - diene-17α-ol-20-one-17-acetate $\lambda_{max}$ 248 m$\mu$ ($\epsilon$=6,000); then with methylene chloride-ethyl acetate (8:2) there is obtained 2.5 parts pure 2-cyano-3-acetyl-amino-19 - nor-pregna - 2,4-diene-17α-ol-20-one-17-acetate. $\lambda_{max}$ 231, 308 ($\epsilon$=10,780, 7,120).

3.5 parts 2 - cyano - 3-acetyl-amino-19-nor-pregna-2,5 (10)-diene-17α-ol-20 - one - 17-acetate is dissolved in 80 parts dry dioxane and added with 2.5 parts 2,3-dicyano-5,6-dichloro-benzoquinone in 40 parts dioxane. After 10 minutes, it is diluted with 700 parts methylene chloride, the 2,3-dicyano-5,6-dichloro-hydroquinone is filtered off and the filtrate is percolated through an alumina column (300 parts) with methylene chloride as the eluent, and the united eluates are evaporated to dryness to give 3.05 parts 2-cyano - 3 - acetylamino-19-nor-pregna-1,3,5(10)-triene-17α-ol-20-one-17-acetate. $\lambda_{max}$ 224, 243, 294 m$\mu$ ($\epsilon$=30,000, 13,000, 2,000).

EXAMPLE 4

2-cyano-3-acetyl-amino-19-nor-pregna-1,3,5(10)-triene-17α-ol-20-one-17-acetate 1 part 2-cyano-3-acetylamino-19-nor-pregna-2,4-diene-17α-ol-20-one-17-acetate in 25 cc. dioxane is heated under stirring and under reflux for 48 hours with 1 part 10% Pd/C and 1.1 part ethyl maleate. The catalyst is filtered off; the filtrate is evaporated to dryness and chromatographed on 100 parts alumina, then it is eluted with methylene chloride-sulfuric ether.

By evaporating the fractions there is obtained 0.47 part 2-cyano-3-acetyl-amino-19-nor-pregna-1,3,5(10) - triene-17α-ol-20-one-17-acetate. The same compound can be obtained also through the acetylation of 2-cyano-3-amino-19-nor-pregna-1,3,5(10)-triene-17α-ol-20-one-17-acetate.

EXAMPLE 5

2-cyano-3-diacetylamino-19-nor-pregna-1,3,5(10)-triene-17α-ol-20-one-17-acetate 3 parts 2-cyano-3-amino-19-nor-pregna-1,3,5(10)-triene-17α-ol-20-one - 17 - acetate is dissolved in 10 parts pyridine and added with 5 parts acetic anhydride; then it is refluxed for 2 hours and after cooling it is diluted with water and filtered.

The solid residue is washed to neutrality and crystallized from sulfuric ether to give 2.75 parts 2-cyano-3-diacetyl-amino-19-nor-pregna - 1,3,5(10) - triene-17α-ol-20-one-17-acetate. $\lambda_{max}$ 234, 270 m$\mu$ ($\epsilon$=14,000; 4,000).

EXAMPLE 6

2-cyano-3-(N-benzyliden)-amino-19-nor-pregna-1,3,5 (10)-triene-17α-ol-20-one-17-acetate To a solution of 2 parts 2 - cyano - 3 - amino-19-nor-pregna-1,3,5(10)-triene-17α-ol-20-one-17 - acetate in 25 parts methanol there is added 0.65 part benzoic aldehyde.

It is kept overnight at room temperature, then it is concentrated, and the crystallized product is filtered out.

The product is recrystallized from methanol to give 1.65 parts 2 - cyano - 3 - (N-benzyliden)-amino-19-nor-pregna-1,3,5(10)-triene-17α-ol-20-one-17 - acetate. $\lambda_{max}$ 249, 256, 309 m$\mu$ ($\epsilon$=21,800, 22,200, 10,600).

EXAMPLE 7

2-cyano-3-N-(ethoxy-methyliden-amino)-19-nor-pregna-1,3,5(10)-triene-17α-ol-20-one-17-acetate A suspension of 2.5 parts 2 - cyano - 3 - amino-19-nor-pregna-1,3,5(10)-triene-17α-ol-20-one-17 - acetate in 60 parts ethyl orthoformate is refluxed for 24 hours, then the solution is evaporated to dryness.

The product is crystallized from acetone to give 2.3 parts 2-cyano-3-N(ethoxy-methyliden-amino) - 19 - nor-pregna-1,3,5(10)-triene - 17α - ol-20-one-17-acetate $\lambda_{max}$ 217, 261 ($\epsilon$=32,000 and 7,400).

EXAMPLE 8

2-cyano-3-N-(ethoxy-carbonyl-amino)-19-nor-pregna-1,3,5(10)-triene-17α-ol-20-one-17-acetate 10 parts 2-cyano-3-amino-19-nor-pregna-2,5(10)-diene-17α-ol-20-one-17-acetate are dissolved in 700 parts toluene. To the solution there is added 13 parts dry finely divided potassium carbonate and 100 parts toluene are distilled under stirring.

16 parts ethyl chlorocarbonate diluted in 20 parts dry toluene are then added dropwise, the whole is refluxed for 24 hours, filtered from the inorganic residue, cooled, washed with water to neutrality and evaporated to dryness to give 9 parts 2-cyano - 3 - (N-ethoxy - carbonyl-amino)-19-nor-pregna - 2,5(10) - diene-17α-ol-20-one-17-acetate $\lambda_{max}$ 247 m$\mu$. To a solution of 8 parts 2-cyano-3-(N-ethoxy-carbonyl-amino) - 19 - nor-pregna-2,5(10)-diene-17α-ol-20-one-17-acetate in 60 parts dioxane there is added 5 parts 2,3-dicyano-5,6-dichloro-benzoquinone in 60 parts dioxane; after 5 minutes, it is diluted with 1000 parts methylene chloride and the reduced product (hydroquinone) is filtered.

The solution is percolated through an alumina (100 parts) column and further eluated with 2000 parts methylene chloride. The united eluates are evaporated to dryness, and the crystallization from sulfuric ether leads to 5.5 parts 2-cyano-3-(N-ethoxy - carbonyl-amino)-19-nor-pregna-1,3,5(10)-triene-17α-ol-20-one-17-acetate.

EXAMPLE 9

2-cyano-3-amino-19-nor-pregna-1,3,5(10)-triene-11β,17α,21-triol-20-one

A suspension of 9.5 parts 2α-cyano-11β-hydroxy-17α, 20:20,21-bis-methylendioxy-19-nor-pregna - 4 - en-3-one in 70 parts dry ethanol is refluxed in a nitrogen current for 48 hours with 3 parts ammonium formate. In such a condition the whole product dissolves, then it is concentrated under vacuum to ⅓ of the original volume, and it is poured into water. The crystallized product is filtered out and washed to neutrality. There is obtained 8 parts of a crude material formed by a mixture of 2-cyano-3-amino-2,4- and -2,5(10)-diene derivatives. By fractionated crystallization from methanol there is obtained 2.5 parts 2-cyano-3-amino-11β-hydroxy-17α,20:20,21 - bis-methylendioxy - 19 - nor - pregna - 2,5(10) - diene $\lambda_{max}$ 264 m$\mu$ ($\epsilon$=9,000) —C≡N 2186 cm.$^{-1}$. From the mother liquors, by means of chromatography through alumina, there is obtained 1.3 parts 2-cyano-3-amino - 11β - hydroxy-17α, 20:20,21-bis-methylendioxy-19-nor-pregna-2,4-diene $\lambda_{max}$ 222, 333 m$\mu$ ($\epsilon$=13,200, 4250) C≡N 2165 cm.$^{-1}$. Two parts of the mixture of the two isomers (2,4-diene and 2,5(10)-diene) are dissolved in 60 parts dry dioxane. To this solution there is added 20 parts of a solution containing 1.25 parts 2,3-dichloro-5,6-dicyano-benzoquinone in dioxane. It is left at room temperature for 10 minutes, it is diluted with methylene chloride, filtered from the precipitated hydroquinone, then the filtrate is percolated through an alumina column, eluted with 1500 parts methylene chloride, the eluates are evaporated to dryness and by crystallization from methanol there is obtained 1.5 parts 2-cyano-3-amino - 11β - hydroxy-17α,20:20,21-bis-methylendioxy-19-nor-pregna-1,3,5(10)-triene $\lambda_{max}$ 221, 331.5 m$\mu$ ($\epsilon$=45,000, 9,250, 3,500). 2 parts 2-cyano-3-amino-11β-hydroxy-17α,20:20,21-bis - methylendioxy-19-nor-pregna-1,3,5(10)-triene is dissolved at room temperature in 60 parts 80% formic acid. After 20 hours it is diluted with 20 parts water and left standing for 20 hours more, at room temperature. Thereafter, the solution is evaporated under a reduced pressure while maintaining the bath temperature at 20° C. The residue is added with 50 parts of a sodium chloride saturated solution and the pH of the medium is brought to 7 by means of an addition of sodium hydroxide concentrated solution, while maintaining the flask in a cooling medium. The precipitate is filtered out, washed with a saturated salt solution to neutrality. Then, the product is dissolved in ethanol, decolorized and filtered; then it is concentrated to dryness and chromatographed through a silica gel column (50 parts). The elution is made with 4:1, 2:1 and 1:1 mixtures of methylene, chloride and acetone, and with acetone. The eluates which come from the 1:1 methylene chloride-acetone and acetone mixtures, contain 2-cyano-3-amino-19-nor-pregna-1,3,5(10)-triene - 11β,17α,21-triol-20-one.

EXAMPLE 10

2-cyano-3-phenylamino-19-nor-pregna-1,3,5(10)-triene-11β,17α,21-triol-20-one

A solution of 2 parts 2α-cyano-17α,20:20,21-bis-methylendioxy-19-nor-pregna-4-en-11β-hydroxy - 3 - one in 50 parts benzene is refluxed for 10 hours with 0.03 part toluene sulfonic acid and 1.5 parts aniline while separating the water which forms during the reaction. The reaction mixture is cooled, alkalized and washed to neutrality, then it is evaporated by dryness. The residue is chromatographed through an alumina column. From the (50:50)hexane:ethyl ether fractions there is obtained 1.2 parts 2-cyano-3-phenylamino-11β-hydroxy - 17α,20:20,21-bis-methylendioxy-19-nor-pregna-2,4-diene $\lambda_{max}$ 259–351 m$\mu$ ($\epsilon$=14,500, 6,000). 1.1 parts 2-cyano-3-phenylamino-11β-hydroxy - 17α,20:20,21 - bis-methylendioxy-19-nor-pregna-2,4-diene is dissolved in 30 parts dioxane, added with 1.2 parts ethyl maleate and with 0.9 part 10% Pd/C. It is refluxed for 48 hours, the catalyst is filtered off, the filtrate is evaporated to dryness and chromatographed through alumina. From the 50:50 hexane-ethyl ether fractions there is obtained 0.4 part 2-cyano-3-phenylamino-11β-hydroxy-17α,20:20,21 - bis-methylendioxy-19-nor-pregna-1,3,5(10) - triene, 2 parts 2-cyano-3-phenylamino-11β-hydroxy-17α,20:20,21 - bis-methylendioxy-19-nor-pregna-1,3,5(10)-triene is dissolved at room temperature in 60 parts formic acid (80% by volume). After 20 hours it is diluted with 20 parts water and left to stand for 20 hours more at room temperature. Thereafter, the solution is evaporated to dryness under a reduced pressure while maintaining the bath temperature at 20° C.

The residue is added with 50 parts of a sodium chloride saturated solution and the pH of the medium is brought to 7 by means of an addition of a concentrated sodium hydroxide solution, while maintaining the flask in a cooling medium. The precipitate is filtered out, it is washed with a saturated salt solution to neutrality. Then, the product is dissolved in ethanol, the ethanol solution is decolorized with charcoal and filtered. The solution is evaporated to dryness and chromatographed through a silica gel column (50 parts) by eluting with methylene chloride-acetone 4:1. The fractions are evaporated to dryness to give 0.8 part 2-cyano-3-phenylamino-19-nor-pregna-1,3,5(10)-triene-11β, 17α, 21-triol-20-one.

EXAMPLE 11

2-cyano-3-phenylamino-19-nor-pregna-1,3,5(10)-triene-17α,21-diol-11,20-dione 2-parts 2 - cyano - 3 - phenylamino - 11β-hydroxy-17α, 20:20,21 - bis - methylendioxy-19-nor-pregna-1,3,5(10)-triene is oxidized with pyridine chromic anhydride overnight at room temperature, then it is diluted with water, filtered, and washed to neutrality. The obtained product, after drying, is crystallized from methanol to give 1.75 parts 2-cyano - 3 - phenylamino-17α,20:20,21-bis-methylendioxy-19-nor-pregna-1,3,5(10)-triene-11-one, 1.5 parts 2-cyano-3-phenylamino-17α,20:20,21-bis - methylendioxy-11-one-19-nor-pregna-1,3,5(10)-triene are treated with 80% formic acid as above to give 0.9 part 2-cyano-3-phenylamino-19-nor-pregna - 1,3,5(10)triene-17α,21-diol-11,20-dione.

EXAMPLE 12

2-cyano-3-amino-19-nor-pregna-1,3,5(10)-6-tetraene-11β, 17α,21-triol-20-one

A solution of 0.9 part 2α-cyano-19-nor-pregna-4,6-diene-11β-hydroxy-17α,20:20,21-bis-methylendioxy - 3 - one in 30 parts dry ethanol is refluxed with 0.9 part ammonium formate. After 24 hours, the solution is concentrated to a small volume and diluted with water. The solid product which separates is filtered out, dried and crystallized from methanol to give 0.55 part 2-cyano-3-amino-11β-hydroxy-17α,20:20,21-bis-methylendioxy - 19-nor-pregna-2,4,6-triene $\lambda_{max}$ 233, 282, 308, 362, mμ ($\epsilon$=12,200, 14,580, 3080, 5700).

0.4 part of this compound is dehydrogenated with 2,3-dichloro-5,6-dicyanobenzoquinone by operating as above. There is obtained 0.2 part 2-cyano-3-amino-11β-hydroxy-17α,20:20,21-bis-methylendioxy-19-nor - pregna - 1,3,5-(10),6-tetraene, from which (dissolved at room temperature in 80 parts 80% formic acid) by operating as in the preceding example, after chromatography through silica gel, there is obtained 0.35 part 2-cyano-3-amino-19-nor-pregna-1,3,5(10),6-tetraene-11β,17α,21-triol-20-one.

EXAMPLE 13

2-cyano-3-amino-19-nor-pregna-1,3,5(10)-17α,21-diol-20-one-17α,21-diacetate 20.5 parts 2α-cyano-19-nor-pregna-4-en-17α,21-diol-3,20-dione-17α,21-diacetate in 950 parts absolute ethanol is refluxed in a nitrogen current for 24 hours with 14 parts ammonium formate. The reaction mixture is concentrated under vacuum to dryness. The residue is suspended in water, extracted with methylene chloride and washed with water to neutrality. The crystallization from methanol gives 17 parts of a mixture of 2-cyano-3-amino-19-nor-pregna-2,4-diene-17α,21-diol-20-one-17α,21-diacetate and of 2-cyano-3-amino-19-nor-pregna-2,5(10)-dien-17α,21-diol-20-one-17α,21-diacetate (3:1) $\lambda_{max}$ 248, 261, 334 mμ ($\epsilon$=5,200, 4,200, 2,050); 11 parts of this mixture, dissolved in 250 parts dry dioxane, is added with 12 parts ethyl maleate and refluxed under stirring for 20 hours with 10 parts 10% Pd/C. The catalyst is then filtered off, and the filtrate evaporated to dryness. The residue, when crystallized from methanol, gives 8 parts 2-cyano-3-amino-19-nor-pregna-1,3,5(10)-triene - 17α,21 - diol - 20 - one-17α,21-diacetate; $\lambda_{max}$ 220, 246, 331 mμ ($\epsilon$=45,750, 9,100, 3,800).

EXAMPLE 14

2-cyano-3N-pyrrolidyl-19-nor-pregna-1,3,5(10)-triene-17α,21-diol-20-one-17α,21-diacetate A solution of 5 parts 2α-cyano-19-nor-pregna-4-en-17α, 21-diol-3,20-dione-17α,21-diacetate in dry benzene is treated with 2 parts pyrrolidine. After 15 hours refluxing, it is dried, and a crystallization from sulfuric ether is effected to give 2.65 parts 2-cyano-3N-pyrrolidyl-19-nor-pregna-2,4-diene-17α,21-diol-20 - one - 17α,21 - diacetate; $\lambda_{max}$ 231, 248, 356 mμ.

1.8 parts of this product is dehydrogenated with 1.3 parts 2,3-dicyano-5,6-dichloro-benzoquinone in dry dioxane. After 5 minutes, the formed precipitate is filtered off, and the filtrate is percolated through a silica gel column. The elution is made with 1000 parts $CH_2Cl_2$ and the eluates are evaporated to give, after crystallization 0.7 part 2-cyano-3-pyrrolidyl-19-nor-pregna - 1,3,5(10) - triene-17α,21-diol-20-one-17α,21-diacetate; $\lambda_{max}$ 224, 246, 312 mμ.

We claim:
1. A compound of the formula:

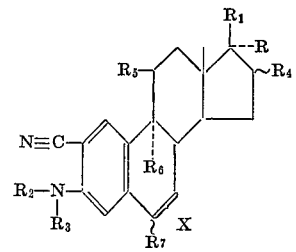

wherein the steroidal ring A is an aromatic ring and being mesomeric it is indifferently 1,3,5(10)-triene and 2,4, 10(1)-triene; wherein:

R is a member selected from the group consisting of hydrogen, hydroxy, and saturated lower hydrocarbon acyloxy;

$R_1$ is a member selected from the group consisting of $$-CO-CH_3, -\overset{CH_3}{\underset{}{C}}\!\!\begin{array}{c}O-CH_2\\|\\O-CH_2\end{array}, -CO-CH_2OH \text{ and } -CO-CH_2-O-acyl$$

where acyl is saturated lower hydrocarbon acyl;

R and $R_1$ together are 17,20:20,21-bis-methylenedioxy;

$R_2$ is a member selected from the group consisting of hydrogen, lower alkyl, phenyl, benzyl, methoxycarbonyl and ethoxycarbonyl;

$R_3$ is a member selected from the group consisting of hydrogen, lower alkyl, and saturated lower hydrocarbon acyl;

$R_2$ and $R_3$ together are

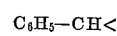

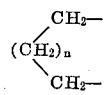

where $n$ is 1 or 2,

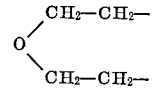

and

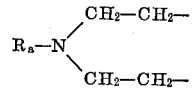

where $R_a$ is a member selected from the group consisting of hydrogen and lower alkyl;

$R_4$ is a member selected from the group consisting of hydrogen and methyl;

$R_5$ is a member selected from the group consisting of hydrogen, β-hydroxy and keto;

$R_6$ is hydrogen;

$R_7$ is a member selected from the group consisting of hydrogen and methyl; and X is a member selected from the group consisting of a single and a double bond.

2. A compound of the formula:

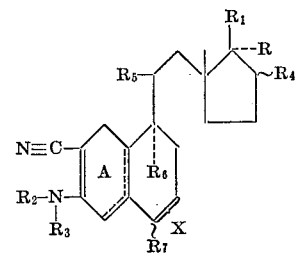

wherein:

R is a member selected from the group consisting of hydrogen, hydroxy, and saturated lower hydrocarbon acyloxy;

$R_1$ is a member selected from the group consisting of

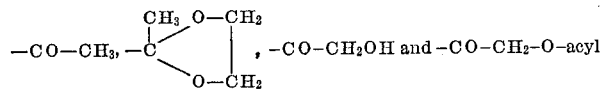

where acyl is saturated lower hydrocarbon acyl;

R and $R_1$ together are 17,20:20,21-bismethylenedioxy;

$R_2$ is a member selected from the group consisting of hydrogen, lower alkyl, phenyl, benzyl, methoxycarbonyl and ethoxycarbonyl;

$R_3$ is a member selected from the group consisting of hydrogen, lower alkyl and saturated lower hydrocarbon acyl;

$R_2$ and $R_3$ together are

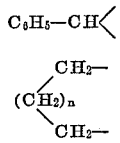

where $n$ is 1 or 2,

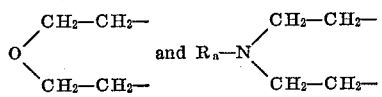

where $R_a$ is a member selected from the group consisting of hydrogen and lower alkyl;

$R_4$ is a member selected from the group consisting of hydrogen and methyl;

$R_5$ is a member selected from the group consisting of hydrogen, β-hydroxy and keto;

$R_6$ is hydrogen;

$R_7$ is a member selected from the group consisting of hydrogen and methyl; and X is a member selected from the group consisting of a single and a double bond, the dotted lines in the ring A indicating that the compound is selected from the group consisting of

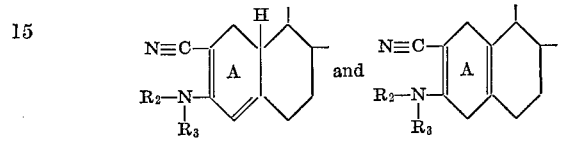

3. A method for the preparation of a compound as claimed in claim 1, comprising dehydrogenating and aromatizing a compound as claimed in claim 2 by means of a hydrogen transfer agent selected from the group consisting of Pd/C and Pt/C in the presence of a hydrogen acceptor selected from the group consisting of ethyl and methyl maleate, fumarate and cinnamate, styrene and stilbene and in a solvent selected from the group consisting of benzene, dioxane, iso-octane, ethylene glycol and mineral oil.

4. A method for the preparation of a compound as claimed in claim 1, comprising dehydrogenating and aromatizing a compound as claimed in claim 2 in the presence of a quinone selected from the group consisting of dichloro-dicyano-benzoquinone and tetrachloro-benzoquinone, and in a solvent selected from the group consisting of benzene, dioxane and iso-octane.

References Cited

Ruggieri et al.: Tetrahedron Letters, No. 50 (1965), pp. 4603–4607.

Ruggieri et al.: Tetrahedron Letters, No. 2 (1966), pp. 205–210.

LEWIS GOTTS, Primary Examiner

E. G. LOVE, Assistant Examiner

U.S. Cl. X.R.

260—239.55, 397.3, 397.4, 397.45, 397.47, 999